United States Patent
Lang et al.

(10) Patent No.: US 6,336,726 B1
(45) Date of Patent: *Jan. 8, 2002

(54) REARVIEW MIRROR ASSEMBLY FOR MOTOR VEHICLES AND FASTENING MEMBER FOR SAME

(75) Inventors: Heinrich Lang, Ergersheim; Albrecht Popp, Weihenzell; Jürgen Pfanz, Schillingsfürst, all of (DE)

(73) Assignee: Lang-Mekra North America, LLC, Ridgeway, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,167

(22) Filed: Apr. 30, 1999

(30) Foreign Application Priority Data

Jan. 28, 1999 (DE) .......................... 199 03 378

(51) Int. Cl.[7] .............................................. G02B 7/182
(52) U.S. Cl. ...................... 359/871; 359/872; 359/881; 359/841
(58) Field of Search ................ 359/871, 872, 359/881, 841, 874, 875, 876; 248/476, 477, 478, 480, 497

(56) References Cited

U.S. PATENT DOCUMENTS

| | | | |
|---|---|---|---|
| 4,394,066 A | 7/1983 | Sharp | |
| 4,951,912 A * | 8/1990 | Manzoni | 248/475.1 |
| 5,074,653 A * | 12/1991 | Mittelhauser | 248/473 |
| 5,107,374 A * | 4/1992 | Lupo et al. | 359/841 |
| 5,148,327 A * | 9/1992 | Gaxiola, Jr. | 359/855 |
| 5,268,797 A | 12/1993 | Santo | |
| 5,327,294 A * | 7/1994 | Koske et al. | 359/872 |
| 5,337,188 A | 8/1994 | Do Espirito Santo | |
| 5,483,385 A * | 1/1996 | Boddy | 359/841 |
| 5,566,030 A | 10/1996 | Yue | |
| 5,604,644 A | 2/1997 | Lang et al. | |
| 5,615,054 A | 3/1997 | Lang et al. | |
| 5,621,577 A | 4/1997 | Lang et al. | |
| D385,243 S | 10/1997 | Lang | |
| 5,687,035 A | 11/1997 | Lang | |
| D387,317 S | 12/1997 | Lang | |
| 5,726,816 A | 3/1998 | Gordon | |
| 5,760,980 A | 6/1998 | Lang | |
| 5,798,882 A | 8/1998 | Lang | |
| D407,361 S | 3/1999 | Lang | |
| 5,880,895 A | 3/1999 | Lang et al. | |
| 6,019,475 A * | 2/2000 | Lynam et al. | 359/879 |
| D427,127 S | 6/2000 | Horowitz | |

* cited by examiner

Primary Examiner—Mohammad Sikder

(57) ABSTRACT

A fastening member for securing a rearview mirror housing to a vehicle and a related rearview mirror assembly are disclosed. The housing has a mirror carrier plate secured therein and defining an opening extending through the housing, the mirror carrier plate including at least one fastening connector disposed adjacent the opening. The fastening member includes a first support arm having a first end and a second end, the first end of the first support arm for securing to the vehicle, a second support arm having a first end and a second end, the first end of the second support arm for securing to the vehicle, the second support arm extending substantially parallel to the first support arm, and a connecting piece extending substantially perpendicular to the first and second support arms and formed integrally with the first and second support arms. The connecting piece includes at least one fastening connector disposed thereon for connection to the at least one fastening connector disposed on the mirror carrier plate to secure the housing to the fastening member and thereby to the vehicle. The fastening member may be formed of plastic, and the connecting piece may extend perpendicularly beyond at least one of the support arms.

28 Claims, 2 Drawing Sheets

REARVIEW MIRROR ASSEMBLY FOR MOTOR VEHICLES AND FASTENING MEMBER FOR SAME

BACKGROUND OF THE INVENTION

The invention concerns a rearview mirror assembly for motor vehicles, wherein the assembly includes a housing having two support arms.

Already in common knowledge is the affixing or connecting of rearview mirrors and/or the housings thereof, with the therein contained mirror pane, to a part of the body of a motor vehicle. This is carried out in such a way that two metallic support arms are fastened on the mirror housing, for example, by screwed connection, and the two free ends of the support arms are then connected to the respective body part, for instance, again by a screwed connection.

For this arrangement, two separate support arms are required, which, under certain circumstances, must have different shapes and/or length. Moreover, these two separate support arms must be affixed onto the mirror housing in respectively different production steps. From the standpoint of both production and logistic grounds, this is seen as disadvantageous.

OBJECTIVES AND SUMMARY OF THE INVENTION

The present invention has the purpose to provide a rearview mirror for motor vehicles so that the disadvantages described are avoided.

To achieve this purpose, the present invention proposes a rearview mirror assembly for motor vehicles, with a mirror pane, which is set in a mirror housing and possessing two support arms, with which the mirror housing is connected to a part of the body of the motor vehicle. This mirror is characterized, in that the two support arms are bound together by a connecting piece essentially at right angles to the support arms, wherein the connecting piece and the two support arms are constructed as one piece (i.e., unitarily) and the connecting piece is integral with the mirror housing.

The present invention calls for the previously separate, two support arms in question to be united in one piece with a connection section, the latter being integral with both support arms. The unit comprised of the connecting piece and the supports affixed thereto is then combined integrally with the mirror housing.

By this design, the installation step of attaching two separate connecting pieces to the mirror housing is dispensed with, so that the production as well as the mounting of the rearview mirror can now be carried out more quickly and at less expense. Furthermore, because of the position of the connecting piece between the two support arms, the connecting piece has a certain axial elongation and reinforces the mirror housing with an advantageous, large surface contact, thus providing improved stability for a rearview mirror designed in accord with the present invention.

Instead of two separate support arms, which must be manufactured, stored, as well as manipulated in the mounting thereof, now only one unit is manufactured, in accord with the invention, this consisting of a connecting piece integrally bound with two support arms, so that the logistic problems in respect to inventory and final installation are substantially reduced.

In accord with a preferred embodiment, the two support arms run essentially parallel to one another and are generally at right angles to the connecting piece. Dependent upon the respective installation or mounting situation on the vehicle body part, the support arms can, obviously, appear at an angle to one another, that is, deviate from the parallel and/or be at an angle to the connecting piece, that is, not necessarily conform to the right angled alignment mentioned above.

Preferentially, the unitized support arms and connecting piece are made of plastic. Although plastic, as a rule, has less rigidity than metal, because of the integral, one-piece design of the support arms and connecting piece, and the flat shape of the connecting piece on the mirror housing, the support arms and connecting piece unit has adequate structural strength even when made of plastic.

Moreover, the manufacture from plastic offers, among other things, the advantages of corrosion resistance, light weight and the possibility of extensive, optional coloration of the material.

The unit comprised of the support arms and the connecting piece can, for instance, be made by injection molding, which allows a controlled production facility which is particularly fast, molds to exact shape and is technologically without problems. Another possibility would be, to produce the support arm/connecting piece by the Resin Transfer Molding (RTM) procedure. With this procedure, the core shape is laid in the casting mold and then, under high pressure, the core is sprayed with a build-up plastic. Again in this case, parts of especially exact shape, with stability and high load capacity, can be fabricated.

The connecting piece can optionally possess an axial extension which exceeds the distance between the two support arms. In this matter, the contact surface is increased in an advantageous manner between the connecting piece and the mirror housing.

If the connecting piece extends axially along both sides, exceeding the corresponding distance between the two support arms, the possibility arises for greater symmetry in the mounting of the support arms on the connecting piece and thereby also the mirror housing, should this be desired. The axial extension of the connecting piece can, moreover, be so great, that in the axial direction, it conforms to the axial extension of the mirror housing. By such a measure, a particularly large-surfaced contact between the connecting piece and the mirror housing is achievable.

If the connecting piece and the mirror housing are releasably bound to one another, then the mirror housing can be taken off the unitized connecting piece and support arms, should this become necessary due to damage to the mirror pane or on other grounds.

Finally, the connecting piece and the mirror housing matingly provide corresponding shape-actuated, snap-on closures, with which the fastening between the connecting piece and the mirror housing can be accomplished very quickly.

Further details, aspects and advantages of the present invention are available from the following description of an embodiment, with the help of the drawings.

BRIEF DESCRIPTION OF THE DRAWINGS

There is shown in.

DESCRIPTION OF THE PREFERRED EMBODIMENT

Reference will now be made in detail to a presently preferred embodiment of the invention. The following example is provided by way of explanation of the invention and not meant as a limitation of the invention. The present invention includes any modifications and variations of the following example as come within the scope of the appended claims and their equivalents.

Examples in the description of the present invention are provided with reference to a rearview mirror assembly for motor vehicles, wherein the rearview mirror, is to be located on the left side, which is, as a rule, the driver side of the vehicle.

Figure 1:
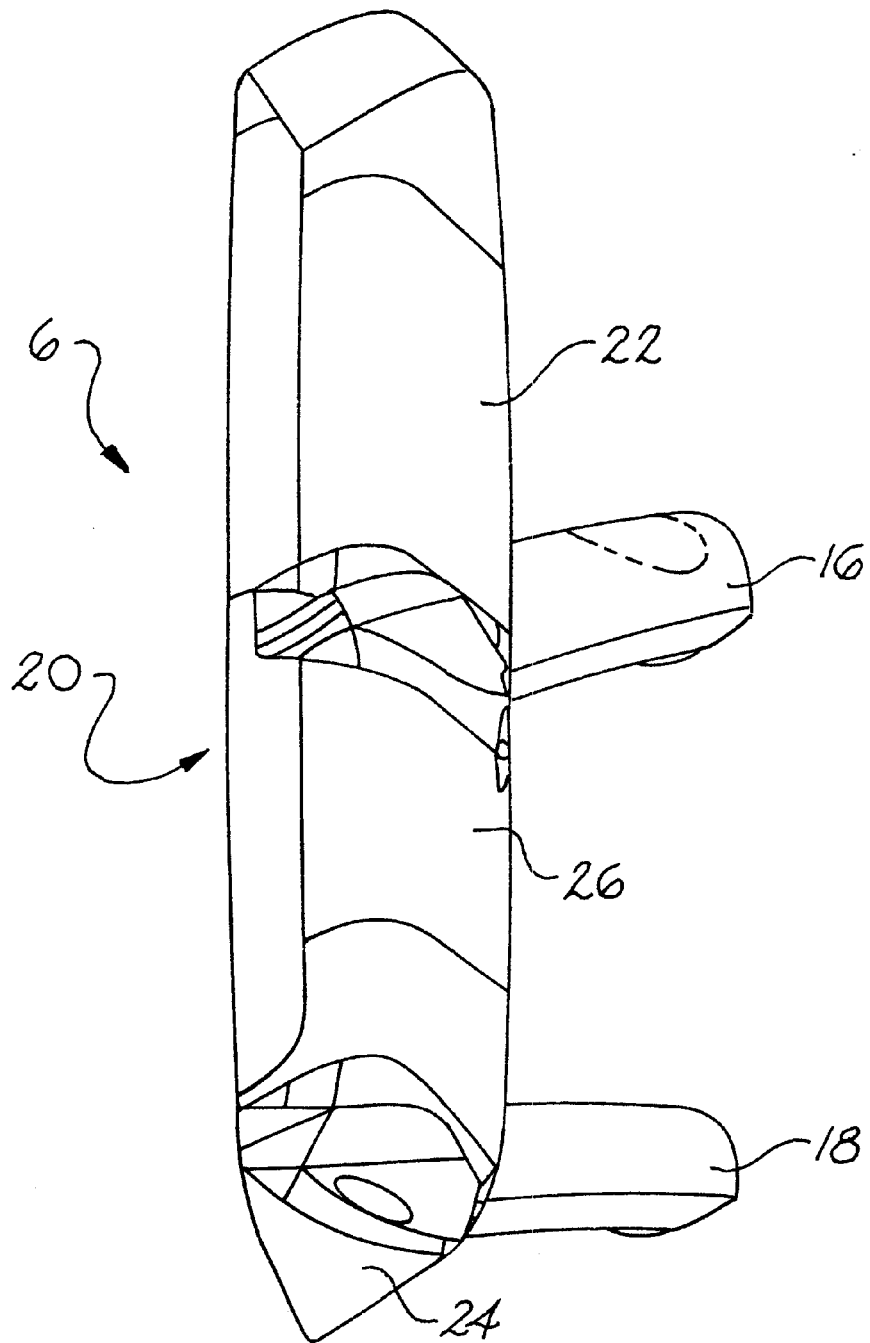
FIG. 1 a perspective view of a fastening element comprised of a connecting piece and support arms, and FIG. 2 a partially-sectioned, exploded top view of the fastening element of FIG. 1 and a mirror housing, illustrating how the mirror housing can be arranged on the one-piece support arms and connecting piece unit.
Figure 2:
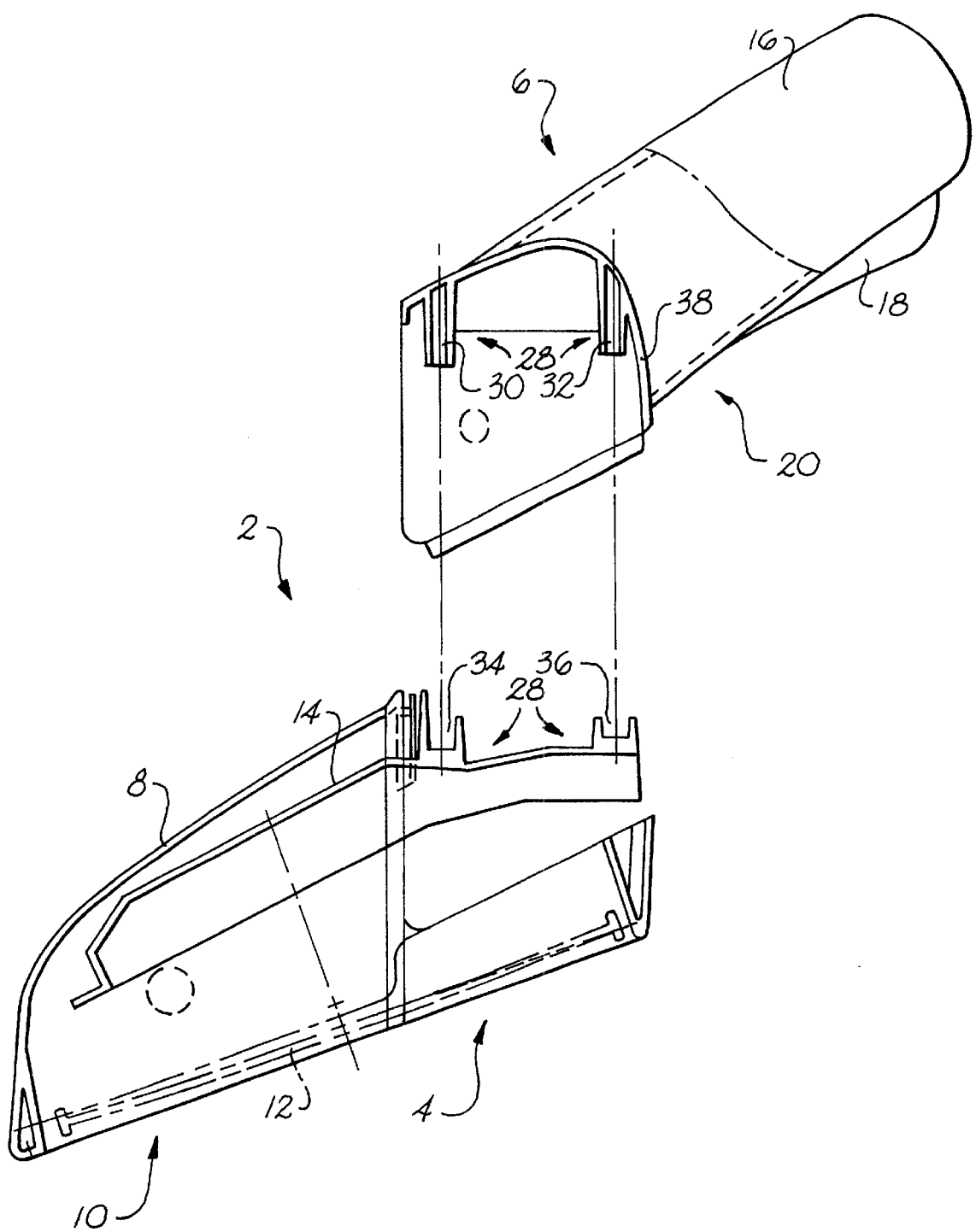

With reference to FIGS. 1 and 2, a rearview mirror assembly, in accord with the invention, is generally designated with the reference number 2. The rearview mirror assembly 2 includes, essentially, a mirror housing 4 and a fastening element 6, with which the mirror housing 4 may be affixed at a distance to a not otherwise described body part of a motor vehicle.

The mirror housing 4 possesses the commonly known and the customary crosssection as known in motor vehicle technology, with a shell 8, domed convexly into the direction of travel and an essentially planar opening 10, opposite direction of travel, into which a mirror pane 12 is installed.

In the interior of the mirror housing 4 are found apparatuses of the conventional kind (not shown) for the adjustment of the mirror pane 12 in relation to the mirror housing 4, in order to change the rear viewing angle. Also found therein will be heating equipment (not shown) for the mirror pane 12, etc. Further, in the embodiment presented in FIG. 2 regarding the interior of the mirror housing 4, is found a carrier plate 14, extending essentially over the entire width and height of the mirror housing 4. The carrier plate 14 is connected to the mirror housing 4 and possesses the fastening connectors with which the mirror housing 4 is mounted on the vehicle or body fastening element 6, as will be explained below in greater detail.

The fastening element 6 is, as shown in FIG. 1, a one-piece unit, and includes essentially two support arms 16 and 18 and a connecting piece 20. The two support arms 16 and 18 are, with their connecting ends, united integrally as one piece with the connecting piece 20, that is to say, mutually molded. The two free or external ends of the support arms 16, 18 are intended for fastening to the vehicle body part. These support arms can run essentially parallel to and essentially vertical to the connecting piece. On the other hand, they can be at an angle to one another and be arranged to deviate from a right angle to the connecting piece 20.

In accord with FIG. 1, the two support arms 16, 18 have hollow interiors. Within these, control or supply cables for adjustment movement of the mirror pane 12, the energy supply lines for the mirror heating, etc. can be enclosed.

The connecting piece 20 is in accord with FIG. 1 lengthy and slim, and possesses in this embodiment an axial longitudinal elongation, which exceeds the spatial interval between the support arms 16, 18. In the embodiment example of FIG. 1, the connecting piece 20 has, extending to the outside, a cover 22 running above the upper support arm 16. Comparable to this is a cover 24 placed under the lower support aim 18. A middle segment 26 lies in between and binds the support arms 16 and 18 to one another. Fundamentally, the middle part 26 would be sufficient as a cover. However, by means of the upper and lower extensions of the cover, the connecting piece 20 possesses in an advantageous way, a larger contact surface onto the mirror housing 4, that is, on the carrier plate 14.

In accord with FIG. 2, the connecting piece 20 as well as the carrier plate 14 possess shape-actuated, snap-on closures that function as fastening connectors 28. These fastening connectors 28, in the presented embodiment, are designed in the form of pins or ridge projections 30 and 32 on the side of the connection piece 20. Corresponding recesses 34 and 36 functioning as fastening connectors 28 are also placed in the carrier plate to grippingly receive the above projections of pins or ridges 30, 32. In addition to these shape-actuated closures between the connecting piece 20 and the carrier plate 14, and the associated mirror housing 4, are still further elements provided to assure the locking in of the shape-actuated, snap-on closures, these being, for example, screws, guides or the like (not shown).

To be seen in FIG. 2, is that in the assembled condition, a peripheral running edge 38 of the connecting piece 20 augments the shell 8 of the mirror housing 4, so that the fastening connectors 28, that is to say, the entire interior of the shell 8 of the mirror housing 4 is closed off from the outside and the penetration of water or other contamination is prevented. Further in this matter, in the area of the edge 38 or on the sides of the mirror housing 4, where there are matching edges, appropriate sealing means can be provided. The assembly of the mirror housing 4 and the fastening apparatus 6 presents, in the finished mounted condition, a closed, water-and wind-proof aerodynamic composite.

The unitary connecting piece 20 and the two holding arms 16, 18 pieces, which form the fastening member 6, are preferably made of plastic. The fastening member 6 can, for instance, be produced by injection molding, in which the connecting piece 20 and the two support arms 16, 18 are formed in one piece.

Another method of procedure, to form the unit out of the connecting piece 20 and, again with one-piece construction to include the support arms 16, 18, is the so-called RTM process, in which a shaping core is set in a casting form and subsequently sprayed with plastic under a high pressure and then immersed, after which the unit is cured. In this way, a body which is particularly stable as to form and rigidity can be made.

The axial extension of the connecting piece 20 shown in FIG. 1 can be of such kind that it corresponds to the structural height of the mirror housing 4. This presents, obviously, only one formulation of the present invention. It would principally be enough, to use only the middle part 26 which binds together in one piece, the two support arms 16 and 18, to bring about the connection between the fastening element 6 and the mirror housing 4. On the basis of the cover extensions 22 and 24, in accord with FIG. 1, there results, however, a large area contact between the connecting piece 20 (or the fastening element 6) and the mirror housing 4, that is, the carrier plate 14 at that location, so that this connection is especially sure, stable and vibration free.

The two support arms 16 and 18 and the connecting piece 20, form, in accord with the above description, a one-piece manufactured unit. Therefore, it is not necessary, to manufacture the two arms separately, to hold them in inventory, to transport, and finally mount them on the mirror housing, since in accord with the present invention, now these two support arms 16 and 18, are made integral with the connecting piece 20, which, in turn, is fastened directly on the mirror housing 4, that is to say, the carrier plate 14, which is present at that location. A rearview mirror assembly made in accordance with the teachings of the present patent is thus more simple, and more economical to manufacture. The use of plastics for the production of the fastening element 6 offers the advantages of a simple manufacture—even of complex shapes—corrosion resistance, abrasion resisting and lasting, penetrative coloring of the material. In spite of the use of the inherently weaker structural characteristics of plastic, the use of plastic instead of metal for the production of the support arms 16 and 18 is, because of the considerable axial extension of the connecting piece 20, which, in the selected embodiment can, as far as possible substantially match the structural height of the mirror housing 4, a sufficiently high stability and loading ability of the entire rearview mirror assembly is assured.

It will be apparent to those skilled in the art that various modifications and variations can be made without departing from the scope and spirit of the invention, as embodied in the appended claims and their equivalents.

What is claimed is:

1. A fastening member for securing a rearview mirror housing to a vehicle, the housing having a mirror carrier plate secured therein and including an edge defining an opening in the housing, the mirror carrier plate including at least one fastening connector disposed adjacent the opening, the fastening member comprising:

a first support arm having a first end and a second end, the first end of the first support arm for securing to the vehicle, the first support arm being a substantially hollow body;

a second support arm having a first end and a second end, the first end of the second support arm for securing to the vehicle, the second support arm extending substantially parallel to the first support arm, the second support arm being a substantially hollow body; and a connecting piece extending substantially perpendicular to the first and second support arms, the connecting piece being a substantially hollow body and being formed integrally with the first and second support arms from a plastic, the connecting piece including an edge defining an opening, the connecting piece edge configured to mate with the housing edge to close the housing opening, the connecting piece including at least one fastening connector for connection to the at least one fastening connector disposed on the mirror carrier plate via the openings to secure the housing to the fastening member and thereby to the vehicle.

2. The fastening member of claim 1, wherein the plastic is injection-molded plastic.

3. The fastening member of claim 1, wherein the plastic is RTM process-formed plastic.

4. The fastening member of claim 1, wherein the connecting piece extends perpendicularly beyond at least one of the first support arm and the second support arm.

5. The fastening member of claim 1, wherein the connecting piece extends perpendicularly beyond both of the first support arm and the second support arm.

6. The fastening member of claim 1, wherein the fastening connectors of the housing and the fastening member are configured so as to be releaseably connectable.

7. The fastening member of claim 1, wherein the fastening element extends so as to close and seal the opening in the housing.

8. A rearview mirror assembly for securing a mirror to a vehicle, the rearview mirror assembly comprising:

a housing having a mirror carrier plate secured therein and including an edge defining an opening in the housing, the mirror carrier plate including at least one fastening connector disposed adjacent the opening; and a fastening member including a first support arm having a first end and a second end, the first end of the first support arm for securing to the vehicle, the first support arm being a substantially hollow body, a second support arm having a first end, and a second end, the first end of the second support arm for securing to the vehicle, the second support arm being a substantially hollow body, the second support arm extending substantially parallel to the first support arm, and a connecting piece extending substantially perpendicular to the first and second support arms, the connecting piece being a substantially hollow body and being formed integrally with the first and second support arms from a plastic, the connecting piece including an edge defining an opening, the connecting piece edge configured to mate with the housing edge to close the housing opening. the connecting piece including at least one fastening connector for connection to the at least one fastening connector disposed on the mirror carrier plate via the openings to secure the housing to the fastening member and thereby to the vehicle.

9. The rearview mirror assembly of claim 8, wherein the plastic is injection-molded plastic.

10. The rearview mirror assembly of claim 8, wherein the plastic is RTM process-formed plastic.

11. The rearview mirror assembly of claim 8, wherein the connecting piece extends perpendicularly beyond at least one of the first support arm and the second support arm.

12. The rearview mirror assembly of claim 8, wherein the connecting piece extends perpendicularly beyond both of the first support arm and the second support arm.

13. The rearview mirror assembly of claim 8, wherein the fastening connectors of the housing and the fastening member are configured so as to be releaseably connectable.

14. The rearview mirror assembly of claim 8, wherein the fastening element extends so as to close and seal the opening in the housing.

15. The rearview mirror assembly of claim 8, wherein the carrier plate extends substantially along the connecting piece.

16. A fastening member for securing a rearview mirror housing to a vehicle, the housing having a mirror carrier plate secured therein and including an edge defining an opening in the housing, the mirror carrier plate including at least one fastening connector disposed adjacent the opening, the fastening member comprising:

a first support arm having a first end and a second end, the first end of the first support arm for securing to the vehicle, the first support arm being a substantially hollow body;

a second support arm having a first end and a second end, the first end of the second support arm for securing to the vehicle, the second support arm extending substantially parallel to the first support arm, the second support arm being a substantially hollow body; and a connecting piece extending substantially perpendicular to the first and second support arms, the connecting piece being a substantially hollow body and being formed integrally with the first and second support arms, the connecting piece extending perpendicularly beyond at least one of the first support arm and the second support arm, the connecting piece including an edge defining an opening, the connecting piece edge configured to mate with the housing edge to close the housing opening, the connecting piece including at least one fastening connector for connection to the at least one fastening connector disposed on the mirror carrier plate via the openings to secure the housing to the fastening member and thereby to the vehicle.

17. The fastening member of claim 16, wherein the fastening member is formed of injection-molded plastic.

18. The fastening member of claim 16, wherein the fastening member is formed of RTM process-formed plastic.

19. The fastening member of claim 16, wherein the connecting piece extends perpendicularly beyond both of the first support arm and the second support arm.

20. The fastening member of claim 16, wherein the fastening connectors of the housing and the fastening member are configured so as to be releaseably connectable.

21. The fastening member of claim 16, wherein the fastening element extends so as to close and seal the opening in the housing.

22. A rearview mirror assembly for securing a mirror to a vehicle, the rearview mirror assembly comprising:

a housing having a mirror carrier plate secured therein and including an edge defining an opening in the housing, the mirror carrier plate including at least one fastening connector disposed adjacent the opening; and a fastening member including a first support arm having a first end and a second end, the first end of the first support arm for securing to the vehicle, the first support arm being a substantially hollow body, a second support arm having a first end and a second end, the first end of the second support arm for securing to the vehicle, the second support arm being a substantially hollow body, the second support arm extending substantially parallel to the first support arm, and a connecting piece extending substantially perpendicular to the first and second support arms, the connecting piece being a substantially hollow body and being formed integrally with the first and second support arms, the connecting piece extending perpendicularly beyond at least one of the first support arm and the second support arm, the connecting piece including an edge defining an opening, the connecting piece edge configured to mate with the housing edge to close the housing opening the connecting piece including at least one fastening connector for connection to the at least one fastening connector disposed on the mirror carrier plate via the openings to secure the housing to the fastening member and thereby to the vehicle.

23. The rearview mirror assembly of claim 21, wherein the fastening member is formed of injection-molded plastic.

24. The rearview mirror assembly of claim 21, wherein the fastening member is formed of RTM process-formed plastic.

25. The rearview mirror assembly of claim 21, wherein the connecting piece extends perpendicularly beyond both of the first support arm and the second support arm.

26. The rearview mirror assembly of claim 21, wherein the fastening connectors of the housing and the fastening member are configured so as to be releaseably connectable.

27. The rearview mirror assembly of claim 21, wherein the fastening element extends to as to close and seal the opening in the housing.

28. The rearview mirror assembly of claim 21, wherein the carrier plate extends substantially along the connecting piece.

* * * * *